O. H. HESS.
GUDGEON.
APPLICATION FILED DEC. 21, 1909.
1,020,906.
Patented Mar. 19, 1912.
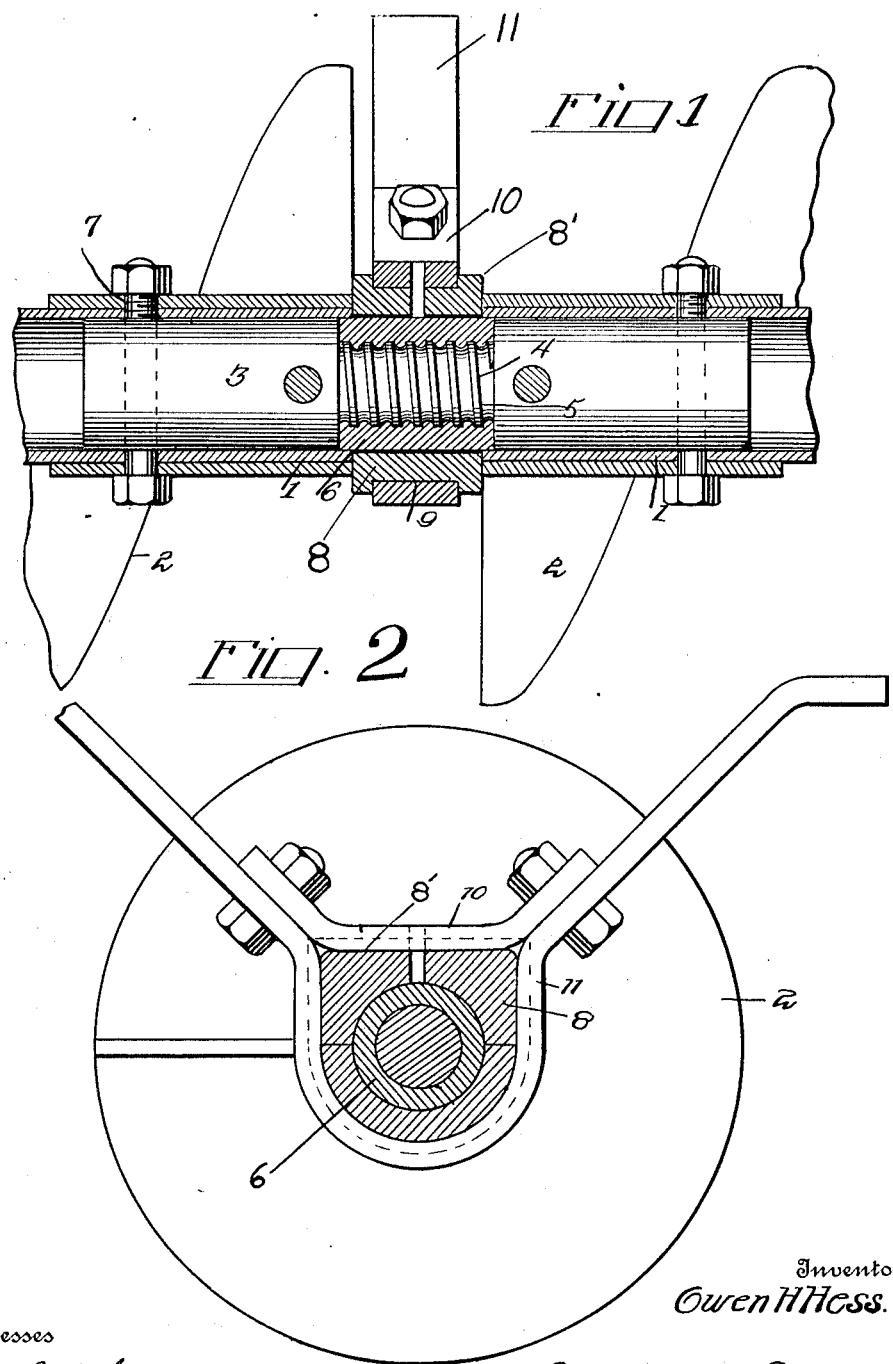
Witnesses
Wm Smith.
D. W. Gould
Inventor
Owen H Hess.
By Victor J. Evans
Attorney

UNITED STATES PATENT OFFICE.

OWEN H. HESS, OF NAZARETH, PENNSYLVANIA.

GUDGEON.

1,020,906.  Specification of Letters Patent.  Patented Mar. 19, 1912.

Application filed December 21, 1909. Serial No. 534,335.

*To all whom it may concern:*

Be it known that I, OWEN H. HESS, a citizen of the United States, residing at Nazareth, in the county of Northampton and State of Pennsylvania, have invented new and useful Improvements in Gudgeons, of which the following is a specification.

The invention relates to an improvement in couplings for conveyer sections, being particularly directed to a coupling constructed to resist the wear incident to the strain on the construction in the use of the conveyer.

The main object of the present invention is the provision of a conveyer coupling in which the flight or conveyer sections are connected by means of a member including a bearing portion to be operatively mounted in a bearing block, both the bearing portion and block being constructed to provide the maximum wear in the use of the conveyer.

The invention in its preferred details of construction will be described in the following specification, reference being had particularly to the accompanying drawings, in which:—

Figure 1 is a view in elevation, partly in section, illustrating the improved coupling. Fig. 2 is a transverse section through the same taken at one side of the hanger.

Referring particularly to the accompanying drawings, it will be understood that the improved coupling is designed to connect conveyer sections 1 provided with the usual flights 2 and to provide a bearing at the point of coupling.

It will be understood that conveyers, particularly in cement mills and the like, are made up of a series of sections of comparatively short lengths to provide a conveyer for carrying the material from one point to another, which conveyer is frequently of three hundred feet in aggregate length. In conveyers of this type a suitable number of couplings and bearings therefor are essential, and therefore it is of extreme importance to have such couplings and bearings of the maximum life and usefulness, as otherwise the frequent necessity of renewal of such part materially reduces the normal output of the mill.

The present invention is designed to provide a coupling and bearing, technically known as a gudgeon which is capable of resisting the strain which the conveyer is subjected to in use and which will materially resist wear, with the effect to materially increase the life of the gudgeon and thereby permit a more continuous operation of the mill with consequent increased output.

The improved gudgeon comprises a bar or cylindrical section 3 of cold rolled steel, said bar being of such diameter at its ends to fit snugly within the proximate ends of the respective conveyer sections 1. This bar is centrally machined to reduce its diameter, as at 4, and is corrugated to provide spiral projections 5 to secure the bearing section against independent relative rotation. The bearing section 6 is of iron cast on the reduced portion of the bar, and chilled so as to render the central portion of uniform diameter with the remaining portions of the bar. The projections 5 on the reduced portion of the bar, serve to fix the bearing section on the bar against independent rotation. The section 6 is of such length that its ends preferably fit within the respective ends of the conveyer sections, and the ends are secured within said sections by bolts 7 passing therethrough, any desired number of bolts being used for the purpose. A divided bearing block 8 is also formed of chilled material being centrally formed with an opening to receive the bearing section 6. The block, which may be of any sectional contour though preferably formed with one squared edge 8' as illustrated, is formed in its exterior surface with an annular channel 9 to receive handle straps 10 and 11, said straps are connected to secure the blocks against rotation and with the terminals of the strap 11 arranged for connection with any overhead support.

The improved gudgeon provides for the maximum wear and thereby increases the life of the parts and prevents the necessity of stopping the mill at short intervals to renew or repair such gudgeons.

The essential feature of the present invention is the casting of the chilled bearing section on the coupling rod and providing a chilled bearing block within which said section is mounted.

Having thus described the invention, what I claim as new is:—

A gudgeon for conveyer sections, comprising a coupling rod circumferentially reduced intermediate its ends, said reduced portion being formed with spiral projections, and a bearing section of chilled material cast on the reduced portion to increase the diameter thereof in accordance with the maximum diameter of the rod, said projections serving to fix the bearing section on the rod against independent rotation.

In testimony whereof I affix my signature in presence of two witnesses.

OWEN H. HESS.

Witnesses:
 JOHN F. BARDILL,
 LUCY KUNKEL.

Copies of this patent may be obtained for five cents each, by addressing the "Commissioner of Patents, Washington, D. C."